United States Patent
Yeh et al.

(10) Patent No.: US 7,274,482 B2
(45) Date of Patent: Sep. 25, 2007

(54) SYSTEM AND METHOD FOR VIEWING AND SELECTING PHOTOGRAPHS USING TV

(75) Inventors: Sabrina Tai-Chen Yeh, Laguna Beach, CA (US); Pamela Lynn Covarrubias, San Diego, CA (US); Hong Nguyen, San Diego, CA (US); Michael Donald McDermott, Chula Vista, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/958,317

(22) Filed: Oct. 4, 2004

(65) Prior Publication Data

US 2006/0001930 A1 Jan. 5, 2006

Related U.S. Application Data

(60) Provisional application No. 60/584,661, filed on Jul. 1, 2004.

(51) Int. Cl.
*G06F 3/12* (2006.01)
*H04N 5/76* (2006.01)

(52) U.S. Cl. ................. 358/1.15; 358/527; 348/231.99

(58) Field of Classification Search ............... 358/1.15, 358/1.16, 1.18, 1.17, 1.1, 404, 444, 468, 358/527, 537, 538, 540; 348/231.99, 231.2, 348/231.6, 231.7, 211.99, 211.4, 207.1, 207.11, 348/207.2

See application file for complete search history.

(56) References Cited

U.S. PATENT DOCUMENTS

| | | | | |
|---|---|---|---|---|
| 5,414,811 | A | * | 5/1995 | Parulski et al. ............. 345/501 |
| 2002/0154337 | A1 | * | 10/2002 | Sakata ....................... 358/1.16 |
| 2003/0048364 | A1 | * | 3/2003 | Ohmura ................... 348/231.6 |
| 2003/0093445 | A1 | * | 5/2003 | Schick et al. ............... 707/205 |
| 2003/0234804 | A1 | * | 12/2003 | Parker et al. ............... 345/719 |
| 2004/0190055 | A1 | * | 9/2004 | Takamatsu et al. ........ 358/1.15 |

\* cited by examiner

*Primary Examiner*—Dov Popovici
(74) *Attorney, Agent, or Firm*—John L. Rogitz

(57) ABSTRACT

Digital photographs can be viewed on a television by inserting into the TV a Memory Stick® or other removable medium bearing the photos. Using the TV remote control, viewers can select photos for printing, as well as the quantity to be printed. Viewers can also cause only those photos that have been selected for printing to be displayed, to facilitate further refining the print list. Then, the removable medium can be removed from the TV and inserted into a photo printer to print the selected photos.

4 Claims, 3 Drawing Sheets

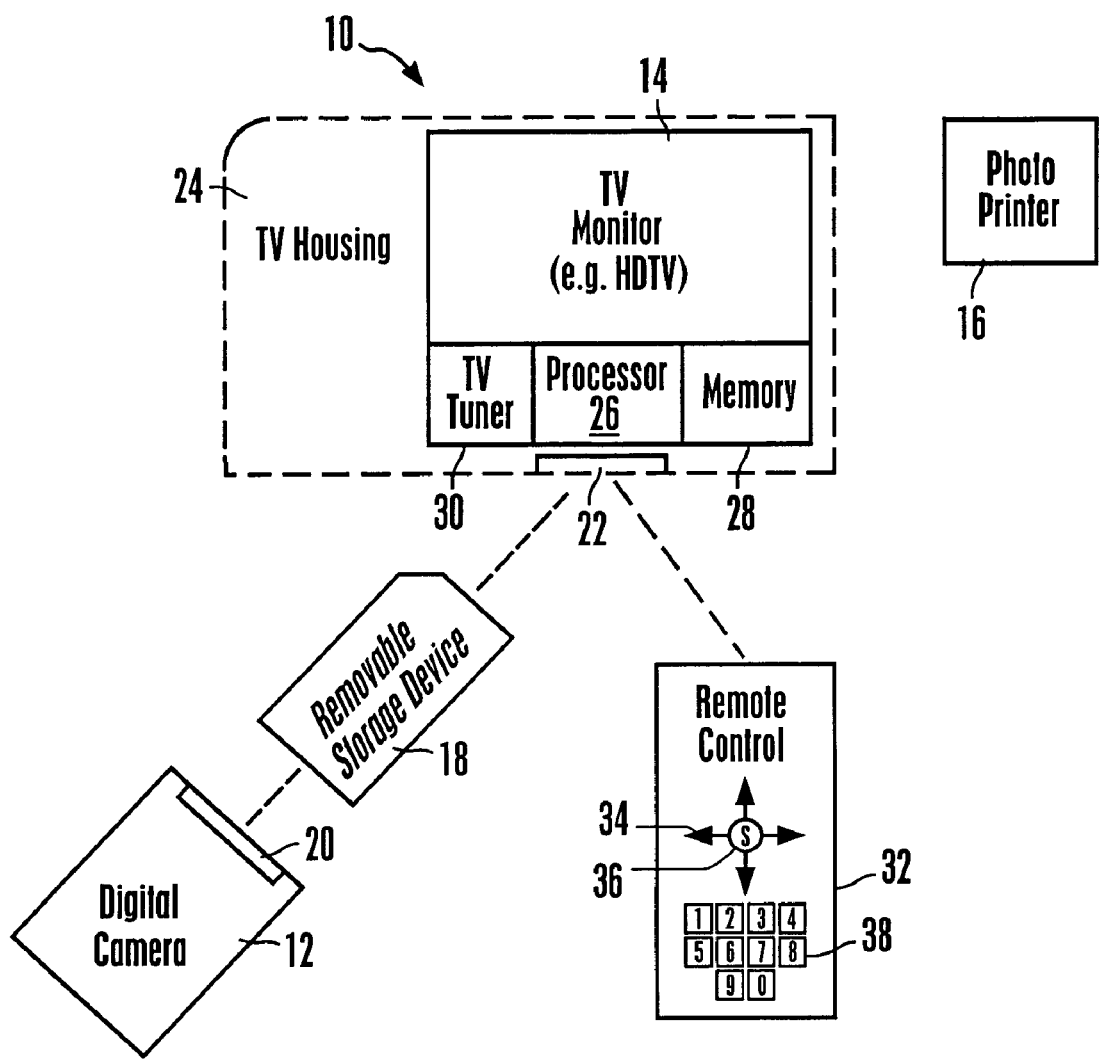
Figure 1 system

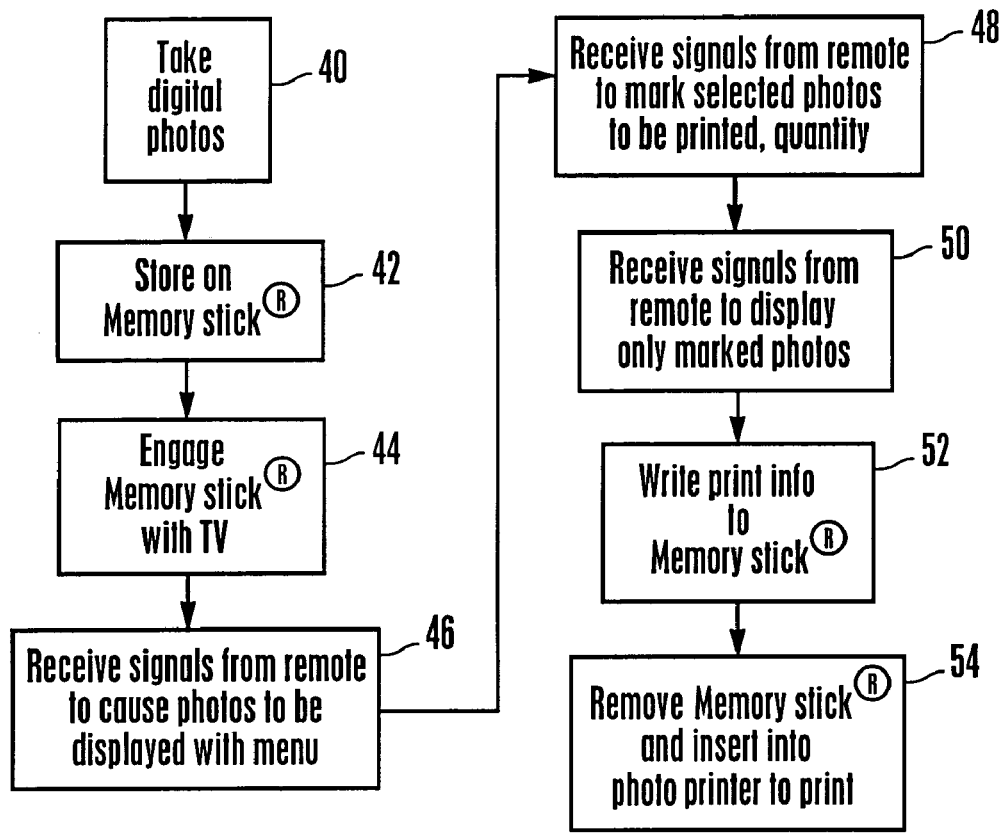
Figure 2 logic
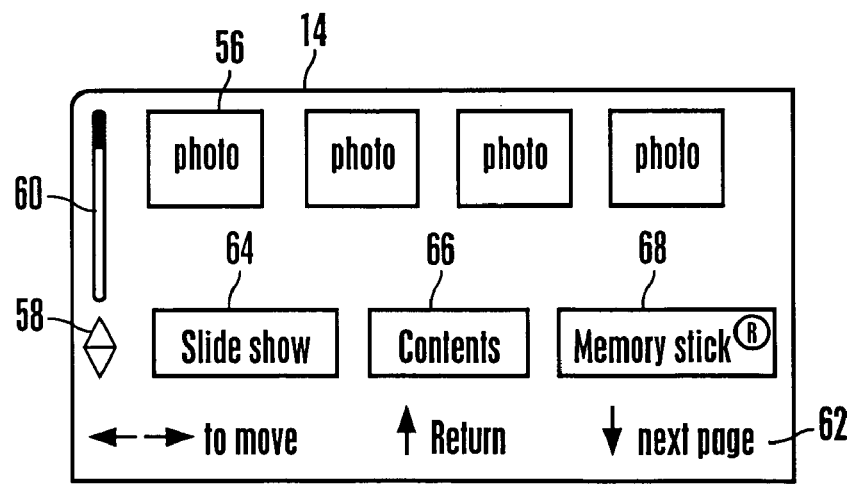
Figure 3 initial screen mark/quantity display display when "contents" button selected

SYSTEM AND METHOD FOR VIEWING AND SELECTING PHOTOGRAPHS USING TV

RELATED APPLICATIONS

This application claims priority from U.S. provisional application Ser. No. 60/584,661, filed Jul. 1, 2004.

FIELD OF THE INVENTION

The present invention relates generally to viewing and selecting photographs, and in particular to viewing and selecting digital photographs.

BACKGROUND

Digital camera users often desire to share their electronically-stored digital photographs with a group of people so that the group can select which photographs to print. However, current methods for group selection of digital photographs for printing either require special equipment and/or are cumbersome and inconvenient. For example, personal computers can be used to select which photos and how many to print, but these methods are cumbersome in a social setting because many people must crowd around a PC monitor to view the photos, with one person sitting between the group and monitor to control the photo selecting software application using keyboard or mouse.

As another example, digital photos can be viewed on some TVs, but not easily selected for printing. Instead, viewers must write down which photos to print, and then later input the desired photo numbers into a photo printer. Specialized digital photograph viewing and printing devices have been provided, but apart from requiring the use of specialized equipment, on these devices viewers cannot winnow the displayed photos down to only the subset that has been selected for printing. Being able to display only those photos that have already been selected for printing is something that users often wish to do, to modify the subset to be printed even further.

In addition to the above methods, the present invention recognizes that a digital camera can be connected to a TV and photos within the camera selected for printing using the camera itself independently of the TV, but this again impedes easy group selection and further does not permit viewing photos that previously might have been edited on a PC, a common situation to either fix/crop photos for printing, or to rename them to meaningful names. Also, like the specialized viewing equipment mentioned above, current methods for displaying digital photographs on a television do not permit viewing only the subset of photos that have been designated for printing to further refine the selections to be printed.

SUMMARY OF THE INVENTION

A television system includes a TV tuner and a TV monitor communicating with the TV tuner for presenting televised content. The system also includes a user-manipulable remote control device. A storage medium is provided for bearing digital photographs, and a processor causes digital photographs from the storage medium to be displayed on the TV monitor. The processor communicates with the remote control device and with the storage medium for executing logic including designating one or more digital photographs for printing, and/or designating a number of prints, and/or causing only photographs selected to be printed to be presented on the monitor, based on signals received from the remote control device, which may be a TV remote control device.

In non-limiting implementations the storage medium is a portable solid state storage medium that may be removably engaged with a digital camera to download the photos to the medium, and also with the TV to display the photos. Or, the storage medium may be distanced from the TV housing and may communicate with the processor over a communication link. The digital photographs on the storage medium can be user-edited photographs. The processor may write print information to the storage medium.

In another aspect, a TV system includes a TV monitor for displaying televised content and a TV processor for controlling a display of the monitor. The TV processor is programmed to access a source of digital photographs, and to generate print information relating to at least one digital photograph associated with the source in response to signals from a remote control device.

In yet another aspect, a method for selecting for printing at least one digital photograph on a storage medium includes establishing communication between the storage medium and a TV system, and displaying plural digital photographs from the storage medium on a TV monitor associated with the TV system. The method also includes receiving viewer designations of which photos are to be printed as well as receiving viewer designations of quantities of photos to be printed. Print information is generated based on the viewer designations and is stored on the storage medium.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an exemplary system in accordance with the present invention;

FIG. 2 is a flow chart showing the logic of the present invention;

FIG. 3 is a view of an exemplary initial screen display;

DETAILED DESCRIPTION OF THE PREFERRED EMBODIMENT

Figure 4:
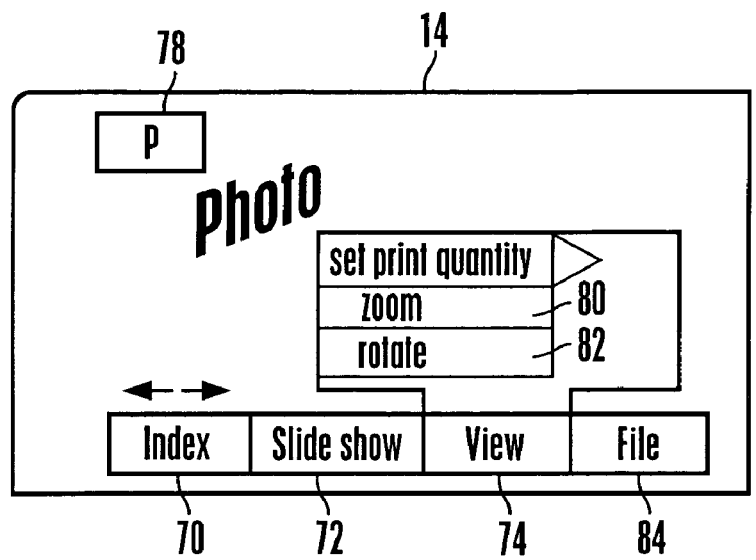
FIG. 4 is a view of an exemplary screen display for designating ("marking") photos to be printed, along with their print quantities.

Referring initially to FIG. 1, a system is shown, generally designated 10, for enabling a person to take digital photographs using a still or video camera 12 and to then use a television video monitor 14 to view the photographs and to easily and conveniently select some or all of them for printing by, e.g., a photo printer 16 such as a kiosk. The monitor 14 can be any suitable TV monitor, and in some embodiments is a high definition (HD) TV monitor. The digital photos may but not must be in JPEG format.

In the exemplary system 10 shown in FIG. 1, the photographs can be stored on a storage medium 18 that advantageously can be a portable solid state memory device such as a Sony Memory Stick7 that can be removably engaged with a memory device bay 20 of the camera 12 to load the medium 18 with digital photos, and then disengaged with the camera 12 and engaged with a memory device bay 22 of a TV housing 24 that is associated with the monitor 14. When the storage medium 18 is engaged with the housing 24, a TV processor 26 can access the digital photographs in accordance with disclosure below for marking some of the photos for printing, with the marking instructions being recorded on the storage medium 18 for access thereof by the printer 16 when the storage medium subsequently is disengaged from the TV and engaged with the printer 16.

In alternate embodiments, the digital photos can be stored on non-portable memory media, with the processor 26 communicating, via wired or wireless links, with the memory media to access the photos. For instance, a so-called "PictBridge" wired or wireless link can be used to communicate digital photos from a storage medium. Instead of a printer kiosk, printing of the photographs can be undertaken by a printer that is connected to the processor 26 by a network or by a universal serial bus (USB) connection. Or, the photos can be uploaded from the TV to an Imagestation™ or other printing service.

Returning to the exemplary system 10 shown in FIG. 1, the processor 26 can also access a memory 28 inside the housing 24. The memory 28 may be any suitable memory device and it can store program code that embodies the logic set forth further below, for execution of the logic by the processor 26. An analog and/or digital TV tuner 30 which may communicate with the processor 26 is also included in the housing for displaying TV programming on the monitor 14.

In accordance with present principles, a viewer of the TV monitor 14 can easily and conveniently select digital photos that can be displayed on the TV monitor 14 for printing using a convenient input/output device. In the exemplary embodiment shown in FIG. 1, the viewer can manipulate an otherwise conventional wireless TV remote control device 32 to select photos for printing. In one embodiment, the remote control device 32 includes up, down, and side arrows 34, a select button 36, and alpha-numeric or numeric buttons 38, for operation discussed below.

Now referring to FIG. 2, the logic of the present invention may be seen. Commencing at block 40, a person uses the camera 12 to take digital photographs. At block 42 the digital photos are stored on the storage medium 18. The storage medium 18 is then removed from the camera 12 and engaged with the TV at block 44, with the processor 26 accessing the digital photos and causing them to be displayed on the TV monitor 14 at block 46 when the viewer appropriately manipulates the remote control device 32.

Proceeding to block 48, the viewer can further manipulate the remote control device 32 to select some or all of the displayed photos for printing. When a viewer selects a photo, the processor "marks" the photo as a photo to be printed. Also, the viewer preferably designates the quantity of copies of the photo to be printed.

If desired, the viewer may wish to display only the subset of photos that he has selected for printing, i.e., the viewer may wish to view only the marked photos. Accordingly, at block 50 the processor 26 can receive viewer-generated signals from the remote control device 32 to display only those photos which have been marked for printing, so that the viewer may further refine the list of photos to be printed. At block 52, the print information generated by the processor 26, e.g., which photos to print and how many of each, is written to the storage medium 18, which can then be removed from the TV and inserted into the printer 16 at block 54 to cause the printer 16 to print the photos in accordance with the print information written to the storage medium 18 by the processor 26. The print information may be in digital print order format (DPOF). Also, DPOF information that may have been written by other devices is preserved, so that if a photo has been previously selected for printing by another system, it remains so tagged.

Figure 5:
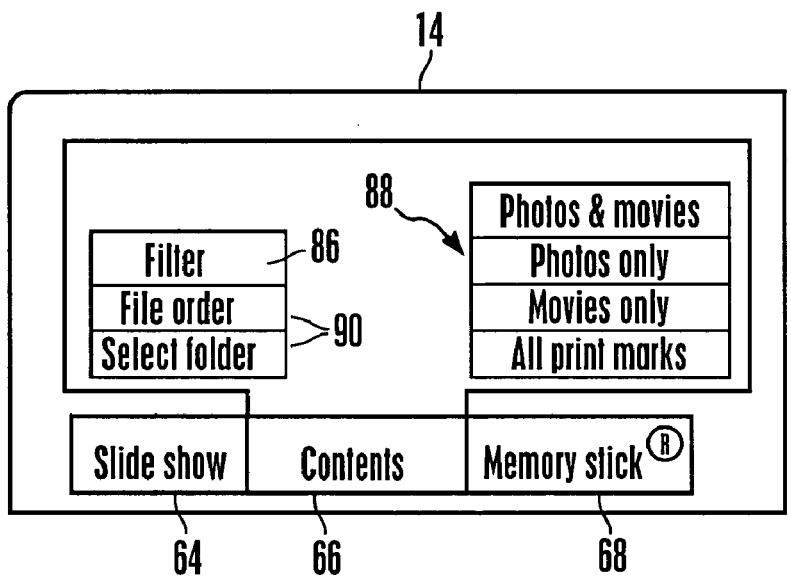
FIG. 5 is a view of an exemplary screen display for causing only photos that have been marked to be printed to be displayed, for further refining the list of photos to be printed.

FIGS. 3-5 are screen displays that can be shown on the monitor 14 and that further illustrate the logic above. FIG. 3 shows an initial display screen that is invoked and in which plural digital photos 56 from the storage medium 18 can be displayed on the monitor 14. Additional photos can be displayed by manipulating the arrows 34 on the remote control device 32 to move a screen cursor over scroll bar up and down arrows 58 (which are associated with a scroll bar 60) and scrolling through the photos. Instructions 62 can also be provided, instructing the viewer how to return to the previous page, move to the next page, etc. When the disclosure below refers to a viewer selecting an object, it is to be understood that this means, in non-limiting implementations, that the viewer manipulates the arrows 34 on the remote control device 32 to position a screen cursor over the object to be selected, and then manipulates the selector button 36 to select the object.

Additionally, various control buttons can be displayed. In the exemplary non-limiting embodiment shown in FIG. 3, a slide show button 64 can be displayed that can be selected by a viewer to cause the digital photos (or thumbnails thereof) to be displayed in aggregate as shown. Also, a contents button 66 can be displayed that can be selected by a viewer to present the display shown in FIG. 5 and discussed further below. A "memory stick" button can be provided which exits the photo display program.

When a viewer looking at the photos 56 shown in FIG. 3 wishes to view one of the photos in greater detail and/or wishes to select the photo for printing, the viewer can simply select the photo. This can cause the screen display of FIG. 4 to be presented. As shown, the display of FIG. 4 includes an enlarged version of the selected photo, along with various buttons. Specifically, an "index" button can be selected to display a list of digital photos available for viewing, along with, if desired, respective indications of whether a photo has been selected for printing. On the other hand, a slide show button 72 can be selected to return to the screen shown in FIG. 3.

Furthermore, a "view" button 72 can be selected to invoke the pop-up menu shown in FIG. 4, which contains additional buttons including a "set print quantity" button 76 which, if selected, causes the processor 26 to mark the photo for printing and which gives the viewer the opportunity to select the number of copies to be printed using, e.g., the number keys 38 of the remote control device 32. When a photo has been marked for printing, an icon 78 indicating such may be superimposed on the photo (and on subsequent displays of thumbnails of the photo) if desired. Also if desired, buttons may be provided to enable a viewer to "select all" photos for printing in one operation, and to de-select all photos that have been selected for printing.

The photo may be zoomed in on by selecting a zoom button 80 and appropriately manipulating the up and down arrows 34 on the remote control device 32. Likewise, the photo may be rotated by selecting a rotate button 82 and appropriately manipulating the arrows 34 on the remote control device 32. On the main toolbar at the bottom of the display, a file button 84 can be selected to cause a secondary pop-up menu (not shown) to be displayed from which the viewer may delete the photo, change the print status and/or quantity to be printed, and protect the photo using appropriate protection schemes including but not limited to passwords, encryption, and the like.

FIG. 5 shows that when the contents button 66 shown in FIG. 3 is selected, a pop-up menu is displayed that contains various secondary control buttons. The pop-up menu may be superimposed over the display of photos. A filter button 86 can be selected to cause genre selector buttons 88 to be displayed, which in turn may be selected to enable the viewer to observe a display of photos and movies (e.g., of thumbnails thereof), or only photos, or only movies, or "all print marks", i.e., only those photos that have been marked for printing. When "all print marks" is selected, the viewer sees only those photos that have been selected for printing, to facilitate further refinement of the print list. If desired, file and folder administrative buttons 90 can be provided to allow the viewer to organize the photos.

While the particular SYSTEM AND METHOD FOR VIEWING AND SELECTING PHOTOGRAPHS USING TV as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A television system, comprising:
    at least one TV tuner;
    a TV monitor communicating with the TV tuner for presenting televised content;
    a user-manipulable control device;
    at least one storage medium bearing digital photographs and being removably engageable with a camera for receiving photographs therefrom; and
    at least one processor for causing digital photographs from the storage medium to be displayed on the TV monitor, the processor communicating with the control device and the storage medium when the storage medium is removed from the camera and is engaged with a slot of a housing holding the TV tuner, the processor executing logic including:
        based on signals from the control device, designating one or more digital photographs for printing;
        based on signals from the control device, designating a number of prints;
        based on signals from the control device, causing only photographs selected to be printed to be presented on the monitor, wherein the processor writes print information to the storage medium.

2. The system of claim 1, wherein the control device is a TV remote control device.

3. The system of claim 1, wherein at least some of the digital photographs on the storage medium can be user-edited photographs.

4. A method for selecting for printing at least one digital photograph on a storage medium, comprising:
    engaging the storage medium with a digital camera distanced from a TV system;
    while the storage medium is engaged with the digital camera, storing at least one digital photograph on the storage medium;
    removing the storage medium from the digital camera and engaging the storage medium with the TV system with the camera being disengaged from the TV system;
    displaying plural digital photographs from the storage medium on a TV monitor associated with the TV system;
    receiving viewer designations of which photos are to be printed;
    receiving viewer designations of quantities of photos to be printed; and
    storing, on the storage medium at the TV system, print information generated based on the viewer designations.

* * * * *